US009904675B2

(12) United States Patent
Kantor et al.

(10) Patent No.: US 9,904,675 B2
(45) Date of Patent: Feb. 27, 2018

(54) AUTOMATIC QUESTION GENERATION FROM NATURAL TEXT

(71) Applicant: International Business Machines Corporation, Armonk, NY (US)

(72) Inventors: Arthur Kantor, Prague (CZ); Jan Kleindienst, Nove Straseci (CZ); Martin Schmid, Stare Hradiste (CZ)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 14/874,807

(22) Filed: Oct. 5, 2015

(65) Prior Publication Data

US 2016/0117314 A1    Apr. 28, 2016

(30) Foreign Application Priority Data

Oct. 27, 2014 (GB) .................................. 1419051.6

(51) Int. Cl.
*G06F 17/27* (2006.01)
*G06F 17/28* (2006.01)

(52) U.S. Cl.
CPC ...... *G06F 17/2785* (2013.01); *G06F 17/2705* (2013.01); *G06F 17/2881* (2013.01)

(58) Field of Classification Search
CPC .................................................. G06F 17/2881
See application file for complete search history.

(56) References Cited

U.S. PATENT DOCUMENTS

| 5,878,385 | A | * | 3/1999 | Bralich | ............... G06F 17/2705 704/10 |
| 6,126,306 | A | * | 10/2000 | Ando | ................... G06F 17/2735 708/605 |
| 6,658,377 | B1 | * | 12/2003 | Anward | ................ G06F 17/271 704/9 |
| 6,675,159 | B1 | * | 1/2004 | Lin | ..................... G06F 17/2705 |
| 7,434,087 | B1 | | 10/2008 | Singh | |
| 8,275,803 | B2 | | 9/2012 | Brown et al. | |

(Continued)

OTHER PUBLICATIONS

List of IBM Patents or Applications Treated as Related, Aug. 19, 2016, 2 pages.

(Continued)

*Primary Examiner* — Eric Yen
(74) *Attorney, Agent, or Firm* — Francis Lammes; Stephen J. Walder, Jr.; Mercedes L. Hobson (57) ABSTRACT

A mechanism is provided for generating a natural language question for a given input text. The input text is parsed using a minimal recursion semantics (MRS) generating grammar to obtain a minimal recursion semantics (MRS) representation of the input text. Semantic rote labelling transforms the input text into at least one semantic association of a verb and semantic arguments of the verb, the semantic arguments of the verb being fragments of the input text. A question type is received for at least one verb/semantic argument association. The MRS representation of the input text is transformed into a MRS representation of one or more questions based on the at least one semantic association of the verb and respective question types. At least one question of the one or more questions is generated based on the MRS representation of the at least one question using the MRS generating grammar.

18 Claims, 8 Drawing Sheets

(56) References Cited

U.S. PATENT DOCUMENTS

| | | | |
|---|---|---|---|
| 2006/0080347 A1* | 4/2006 | Potts | G06F 17/30377 |
| 2007/0067293 A1* | 3/2007 | Yu | G06F 17/30687 |
| 2007/0073533 A1* | 3/2007 | Thione | G06F 17/279 |
| | | | 704/9 |
| 2007/0136246 A1* | 6/2007 | Stenchikova | G06F 17/279 |
| 2007/0245167 A1 | 10/2007 | De La Cruz et al. | |
| 2009/0150718 A1 | 6/2009 | Park et al. | |
| 2009/0287678 A1 | 11/2009 | Brown et al. | |
| 2011/0066587 A1 | 3/2011 | Ferrucci et al. | |
| 2011/0125734 A1 | 5/2011 | Duboue et al. | |
| 2013/0007055 A1 | 1/2013 | Brown et al. | |
| 2013/0018652 A1 | 1/2013 | Ferrucci et al. | |
| 2013/0046731 A1 | 2/2013 | Ghosh et al. | |
| 2013/0066886 A1 | 3/2013 | Bagchi et al. | |
| 2013/0304749 A1* | 11/2013 | Cooper | G06F 17/30867 |
| | | | 707/748 |
| 2014/0040181 A1 | 2/2014 | Kuznetsov | |
| 2014/0136188 A1* | 5/2014 | Wroczynski | G06F 17/2872 |
| | | | 704/9 |
| 2015/0104764 A1* | 4/2015 | Murray | G06F 3/0481 |
| | | | 434/169 |
| 2015/0199400 A1* | 7/2015 | Wu | G09B 7/02 |
| | | | 434/353 |

OTHER PUBLICATIONS

"Tivoli Storage FlashCopy Manager Installation and User's Guide for AIX", IBM Corporation, Version 2.1, Program No. 5724-X94, Copyright International Business Machines Corporation 2001, 2009, 194 pages.
High, Rob, "The Era of Cognitive Systems: An Inside Look at IBM Watson and How it Works", IBM Corporation, Redbooks, Dec. 12, 2012, 16 pages.
Jang, Yong-Il et al., "An Extendible Hashing Based Recovery Method in a Shared-Nothing Spatial Database Cluster", Computational Science and Its Applications, ICCSA 2006, International Conference, Proceedings, Part IV, Glasgow, UK, May 8-11, 2006, 10 pages.
Kiekintveld, Christopher et al., "Computing Optimal Randomized Resource Allocations for Massive Security Games", Proceedings of the 8th International Conference on Autonomous Agents and Multiagent Systems (AAMAS 2009), May 10, 2009, 8 pages.
Lawson, Susan et al., "Best Practices for DB2 on z/OS Backup and Recovery", BMC Software, www.db2expert.com and BMC Software, Jun. 2009, 96 pages.
McCord, M.C. et al., "Deep parsing in Watson", IBM J. Res. & Dev. vol. 56 No. 3/4 Paper 3, May/Jul. 2012, pp. 3:1-3:15.
Pita, James et al., "Deployed ARMOR Protection: The Application of a Game Theoretic Model for Security at the Los Angeles International Airport", Proceedings of the 7th Conference on Autonomous Agents and Multiagent Systems (AAMAS 2008), Industry and Applications Track, Berger, Burg, Nishiyama (eds.), Estoril, Portugal, May 12-16, 2008, 8 pages.
Yuan, Michael J., "Watson and healthcare, How natural language processing and semantic search could revolutionize clinical decision support", IBM developerWorks, IBM Corporation, Apr. 12, 2011, 14 pages.
Copestake, Ann, "Implementing Typed Feature Structure Grammars", Book, CSLI Publications, CSLI lecture notes, vol. 110, Apr. 1, 2002, 233 pages.
Pradhan, Sameer S. et al., "Support Vector Learning for Semantic Argument Classification", Machine Learning, 60(1-3), Sep. 2005, 30 pages.
Report under Section 17(5)(b) dated Apr. 24, 2015, Application No. GB1419051.6, 5 pages.
"Teaching Children to Read: An Evidence-Based Assessment of the Scientific Research Literature on Reading and Its Implications for Reading Instruction", National Reading Panel, Reports of the Subgroups, Apr. 2000, 221 pages.
"Teaching Children to Read: An Evidence-Based Assessment of the Scientific Research Literature on Reading and Its Implications for Reading Instruction", National Reading Panel, Reports of the Subgroups, Apr. 2000, 228 pages.
Ali, Husam et al., "Automation of Question Generation From Sentences", Proceedings of QG2010: The Third Workshop on Question Generation, The Tenth International Conference on Intelligent Tutoring Systems (ITS2010), Pittsburgh, Pennsylvania, Jun. 18, 2010, pp. 58-67.
Boyer, Kristy E. et al., "QG2010: The Third Workshop on Question Generation", The Tenth International Conference on Intelligent Tutoring Systems (ITS2010), Pittsburgh, Pennsylvania, Jun. 18, 2010, 2 pages.
Callmeier, Ulrich, "PET—a platform for experimentation with efficient HPSG processing techniques", Cambridge University Press, Natural Language Engineering, vol. 6, No. 1, Mar. 2000, pp. 99-107.
Copestake, Ann et al., "Minimal Recursion Semantics: An Introduction", Springer, Research on Language and Computation, vol. 3, Issues 2-3, Jul. 2005, pp. 281-332.
Dunning, Ted, "Accurate Methods for the Statistics of Surprise and Coincidence", MIT Press, Computational Linguistics, vol. 19, No. 1, Mar. 1993, pp. 61-74.
Flickinger, Dan et al., "On building a more efficient grammar by exploiting types", Cambridge University Press, Natural Language Engineering, Special Issue on Efficient Processing with HPSG: Methods, Systems, Evaluation, vol. 6, Part 1, Mar. 2000, pp. 15-28.
Heilman, Michael, "Automatic Factual Question Generation from Text", Carnegie Mellon University, Language Technologies Institute, School of Computer Science, Doctoral Thesis in the field of Language Technologies, CMU-LTI-11-004, Jan. 2011, 206 pages.
Kipper, Karin et al., "A large-scale classification of English verbs", Springer Netherlands, Language Resources & Evaluation, vol. 42, No. 1, Mar. 2008, pp. 21-40.
Lindberg, David, "Automatic Question Generation From Text for Self-Directed Learning", Simon Fraser University, http://summit.sfu.ca/system/files/iritems1/12985/etd7872_DLindberg.pdf, Applied Sciences: School of Computing Science, Master of Science Thesis, Jun. 26, 2013, 81 pages.
Mannem, Prashanth et al., "Question Generation from Paragraphs at UPenn: QGSTEC System Description", Proceedings of QG2010: The Third Workshop on Question Generation, The Tenth International Conference on Intelligent Tutoring Systems (ITS2010), Pittsburgh, Pennsylvania, Jun. 18, 2010, pp. 84-91.
Miller, George A., "WordNet: A Lexical Database for English", Association for Computing Machinery, Communications of the ACM, vol. 38, No. 11, Nov. 1995, pp. 39-41.
Mostow, Jack et al., "Generating Instruction Automatically for the Reading Strategy of Self-Questioning", IOS Press, Proceeding of the 2009 conference on Artificial Intelligence in Education: Building Learning Systems that Care: From Knowledge Representation to Affective Modelling, Jul. 2009, 7 pages.
Pal, Santanu et al., "QGSTEC System Description-JUQGG: A Rule based approach", Proceedings of QG2010: The Third Workshop on Question Generation, The Tenth International Conference on Intelligent Tutoring Systems (ITS2010), Pittsburgh, Pennsylvania, Jun. 18, 2010, pp. 76-79.
Palmer, Martha et al., "The Proposition Bank: An Annotated Corpus of Semantic Roles", MIT Press, Computational Linguistics, vol. 31, No. 1, Mar. 2005, pp. 71-105.
Papineni, Kishore et al., "BLEU: a Method for Automatic Evaluation of Machine Translation", Association for Computational Linguistics, Proceedings of the 40th Annual Meeting of the Association for Computational Linguistics (ACL), Philadelphia, Pennsylvania, Jul. 2002, pp. 311-318.
Prager, John et al., "Answering What-is Questions by Virtual Annotation", Association for Computational Linguistics, Proceedings of the first international conference on Human language technology research (HLT '01), Stroudsburg, Pennsylvania, Mar. 2001, 5 pages.
Punyakanok, Vasin et al., "The Importance of Syntactic Parsing and Inference in Semantic Role Labeling", MIT Press, Computational Linguistics, vol. 34, No. 2, Jun. 2008, pp. 257-287.

(56) References Cited

OTHER PUBLICATIONS

Ratinov, Lev et al., "Design Challenges and Misconceptions in Named Entity Recognition", Association for Computational Linguistics, Proceedings of the Thirteenth Conference on Computational Natural Language Learning (CoNLL), Boulder, Colorado, Jun. 2009, pp. 147-155.
Recasens, Marta et al., "The Life and Death of Discourse Entities: Identifying Singleton Mentions", Association for Computational Linguistics, Proceedings of the NAACL-HLT, Atlanta, Georgia, Jun. 9-14, 2013, pp. 627-633.
Sag, Ivan A. et al., "Generating Questions with Deep Reversible Grammars", Proceedings of the First Workshop on the Question Generation Shared Task and Evaluation Challenge, Arlington, Virginia: NSF, Sep. 2008, 3 pages.
Varga, Andrea et al., "WLV: A Question Generation System for the QGSTEC 2010 Task B", Proceedings of QG2010: The Third Workshop on Question Generation, The Tenth International Conference on Intelligent Tutoring Systems (ITS2010), Pittsburgh, Pennsylvania, Jun. 18, 2010, pp. 80-83.
Yao, Xuchen, "Question Generation With Minimal Recursion Semantics", University of Groningen & Saarland University, http://cs.jhu.edu/~xuchen/paper/Yao2010Master.pdf, European Masters Program in Language and Communication Technologies, Master Thesis, Aug. 2010, 92 pages.
Yao, Xuchen et al., "Semantics-based Question Generation and Implementation", Dialogue and Discourse, Special Issue on Question Generation, vol. 3, No. 2, Mar. 2012, pp. 11-42.

\* cited by examiner

AUTOMATIC QUESTION GENERATION FROM NATURAL TEXT

BACKGROUND

The invention relates to question generation environments. More in detail, the invention relates to a method for automatically generating questions based on natural input text, specifically natural language input sentences.

Systems for automatically generating questions from natural language sentences are already known in prior art. For example, automatic question generation is used in automatic tutoring systems, for the purposes of teaching and testing reading comprehension.

Automatic question generation (QG) algorithms naturally separate into the sub-tasks of target selection and grammatical question generation about a target. A target is defined as the pair or tuple comprising a question type and a target phrase, where the question type may be who/what/where/when/how many/etc. or it may be a more specialized question, e.g. "What animal". The target phrase is a contiguous portion of the input sentence on which the question is referring to. The (optionally modified) target phrase is also the answer to the question.

A major drawback of a system for automatically generating questions performing the sub-tasks of selecting a target within the input text and grammatical question selection about the target is that a large number of rules have to be considered for generating a grammatically correct question based on the target.

SUMMARY

It is an objective of embodiments of the invention to provide an effective and resource-efficient method for automatic question generation. The objective is solved by the features of the independent claims. Preferred embodiments are given in the dependent claims. If not explicitly indicated otherwise, embodiments of the invention can be freely combined with each other.

in one illustrative embodiment, a computer-implemented method for generating a natural language question for a given input text is provided. The illustrative embodiment parses the input text using a minimal recursion semantics (MRS) generating grammar to obtain a minimal recursion semantics (MRS) representation of the input text. The illustrative embodiment transforms, by semantic role labelling (SRL), the input text into at least one semantic association of a verb and semantic arguments of the verb, the semantic arguments of the verb being fragments of the input text. The illustrative embodiment receives a question type for at least one verb/semantic association. The illustrative embodiment transforms the MRS representation of the input text into a MRS representation of one or more questions based on the at least one semantic association of the verb and respective question types. The illustrative embodiment generates at least one question of the one or more questions based on the MRS representation of the at least one question using the MRS generating grammar.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention be described in, or will become apparent to those of ordinary skill in the art in view of, the following detailed description of the example embodiments of the present invention.

BRIEF DESCRIPTIONS OF THE DRAWINGS

Embodiments are described with reference to the attached drawings, in which.

DETAILED DESCRIPTION

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system," Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

Figure 1:
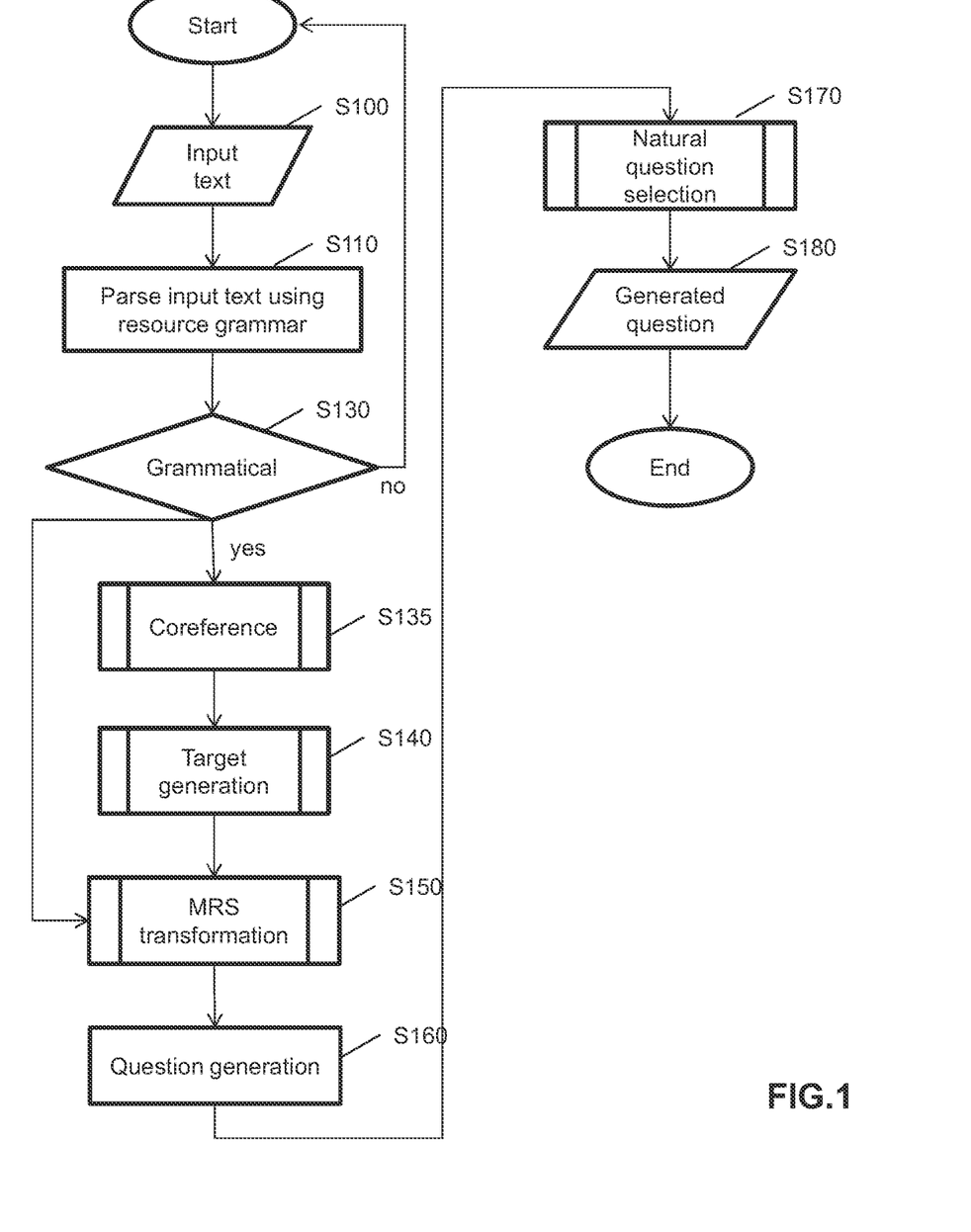
FIG. 1 schematically illustrates an example data flow structure of an automatic question generating system.

FIG. 1 illustrates the steps performed in a data processing system for automatically generating questions based on an input text. Specifically, the input text may comprise one or more input sentences. At the beginning, an input text may be input to the data processing system (S100). Said input may be initiated by a data input provided by a computer system or may be initiated by a user input. The input text may be provided to a parsing entity which parses the input text using a MRS grammar (S110). The parsing entity may, for example, use English Resource Grammar (ERG) thereby obtaining semantics represented in the minimal recursion semantics (MRS) formalism. In other words, the parsing entity may be a MRS parser. Based on the output of the parsing entity, the data processing system may decide whether the input text is grammatically correct (S130). If the input text is grammatically correct, the data processing system may continue the question generation process, otherwise the question generation process may be stopped and the data processing system may wait until the next input text is received.

According to an embodiment, a target generation process may be started after checking the grammatical correctness of the input text (S140). According to another embodiment, the target generation process may be started in parallel with the parsing entity parsing the input text based on a resource grammar. The target generation process may also receive the input text and may search for targets. A target is a tuple or pair of information comprising a question type and a target phrase. The question type may be a who/what/where/when/ how many/etc. question. Alternatively, the question type may be a more specialized question (e.g. "What animal"). The target phrase is a contiguous part of the sentence which provides information regarding the answer to a question having said question type. The target generation process uses semantic role labeling (SRL) for generating targets based on the input text.

Before starting the target generation process (S140), a disambiguation or co-reference process may be performed (S135). By means of the disambiguation process, vague references to words (or—more generally—to text passages) can be replaced by more informative ones thereby improving the quality and understandability of the generated question. The disambiguation process may provide a disambiguated MRS representation which may be used as an input of the MRS transformation process described later on.

In order to replace vague references to text passages, the disambiguation process makes use of the fact that there may be multiple references to a certain text passage in the same sentence or other sentences close to said sentence. Some of said references may be more informative than the ones in a particular target. The disambiguation process may perform a co-reference resolution algorithm. The goal of said co-reference resolution algorithm is to find all references to a specific text passage or target phrase.

For example, in the sentence

"Jenny's parents knew that Jenny loved animals, so they took her to the zoo"

a valid target may be ("Who"; "they"), which will ultimately be used to generate the low-quality question/answer pair ("Who took her to the zoo?"; "They"). However, an effective co-reference resolution algorithm would yield the reference clusters: {"Jenny's parents"; "they"} and {"Jenny", "her"}, where each cluster refers to the same entity (specifically, a certain target phrase). For each entity, we can pick the most informative term, and use it in place of the other term, so that we can generate the improved question/answer pair ("Who took Jenny to the zoo?", "Jenny's parents"). So, the semantic representation of the example sentence can be transformed into the semantic representation of:

"Jenny's parents knew that Jenny loved animals, so Jenny's parents took Jenny to the zoo."

The references in the target must also be replaced, so the target becomes (Who; "Jenny's parents") and the question/answer pair becomes the nicer ("Who took Jenny to the zoo?"; "Jenny's parents").

Under some circumstances, a term should not be replaced by the most informative reference. For example, consider the sentence:

"Jenny drove her car to the mall."

Without performing any disambiguation, we can generate the reasonable questions/answers:

1) Where did Jenny drive her car?/To the mall.
2) What did Jenny drive to the mall?/Jenny's car or her car.
3) Who drove her car to the mall?/Jenny, In the first question it's more natural not to replace the term "her" with the reference "Jenny's" because the informative reference "Jenny" is already included in the question.

In the second question/answer pair, the most informative reference (Jenny) is in the question and the replaceable reference (Her) is in the answer. In this case, the non-informative reference for that term may be allowed as the correct answer, because "Her car" should be an acceptable answer.

In the third example, the most informative reference is in the answer, so care must be taken not to give away the answer by replacing the question references "her". So, the disambiguation process has to decide based on the respective target whether to replace a term by its reference or not.

Returning to FIG. 1, a target provided by the target generation process (S140) (or a target modified by the disambiguation process) may be used as an input for the MRS transformation process (S150). The MRS transformation process may transform the MRS representation of the input text into a MRS representation of the question to be generated. Thereby, for each target, a question MRS representation is generated by means of the MRS transformation process. So, after generating a target by means of the target generation process using a SRL tool, the MRS representation of the input text is converted into a question MRS representation while making sure that the resulting MRS representation remains valid.

The MRS transformation process makes use of the fact that—for a certain MRS generating grammar, for example English Resource Grammar (ERG), the semantic representation, specifically the MRS representation of a statement (i.e. the input text) is similar to the semantic representation, specifically the MRS representation of the corresponding question. Therefore, the transformation from statement to question can be specified with a small number of rules in the MRS representation. This contrasts with other approaches which specify the transformation rules in lexical or syntactic domains, where the number of rules is expected to be much higher. Based on the question MRS representation, the question is generated by using the same grammar used for parsing, in general, MRS grammar, for example ERG in a question generation step (S160). So, summing up, the question generation process uses a combination of SRL for selecting a target within the input text and MRS generating grammar (for example, ERG) for parsing the input text for obtaining the MRS input text representation and generating the question based on the question MRS representation (which is derived out of the MRS input text representation by means of the MRS transformation process).

Based on the question MRS representation and the MRS generating grammar, the question generation step may generate a plurality of questions all having the same meaning, wherein the generated questions may differ from each other with regard to their naturalness. Therefore, a question ranking and selection step may be performed which selects the most natural question out of the plurality of questions (S170). The naturalness of the question may be assessed based on the similarity of the generated question to the input text. Said similarity may be assessed based on an algorithm evaluating the similarity between a machine-generated question and a natural human question, for example, the Bilingual Evaluation Understudy (BLEU) algorithm. The question ranking and selection step uses the fact that the input text is natural-sounding and natural-sounding questions are similar to said input text.

After selecting a specific question out of the set of questions using question ranking and selection (S170), a single generated question is provided for each target as the output of the question generation process (S180).

Figure 2:
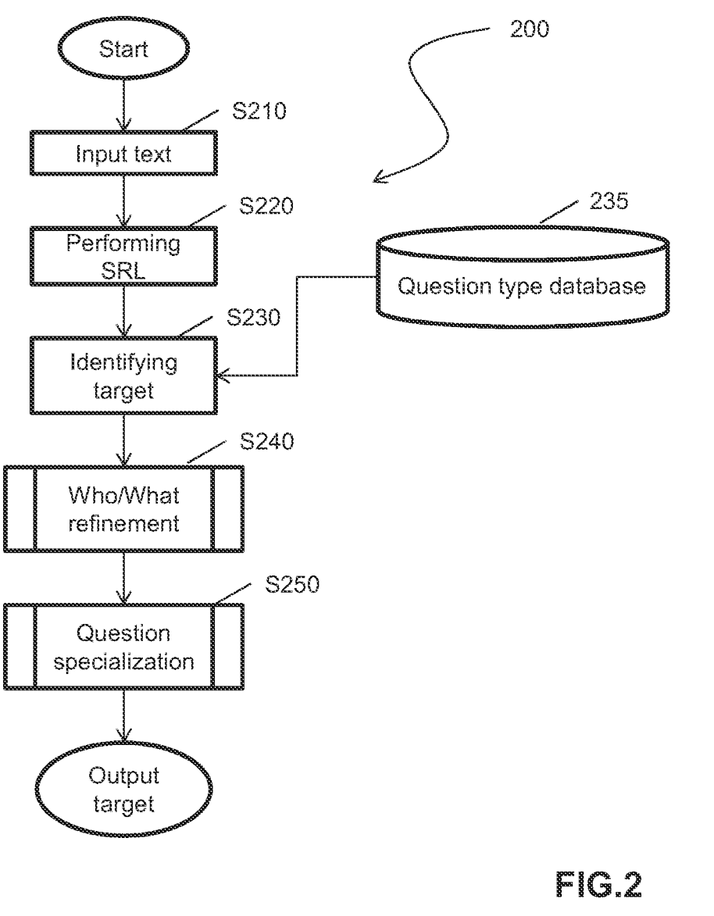
FIG. 2 schematically illustrates an example data flow structure of a target generation process.

With reference to FIG. 2, the target generation process 200 is described in closer detail. After receiving the input text (S210), targets are selected within the input text by performing semantic role labeling SRL (S220). It is worth mentioning that performing SRL may be done in parallel to parsing the input text using a resource grammar. Target selection may be performed using an external semantic role labeler. The semantic role labeler may tag all the verbs of the input text with their sense (meaning) and may determine for each verb the text fragments (specifically fragments of a sentence) that act as arguments to that verb. The possible verb senses and arguments are taken from the proposition bank PropBank (Martha Palmer, Daniel Gildea, and Paul Kingsbury; The proposition bank: An annotated corpus of semantic roles. Comput. Linguist., 31(1):71-106; March 2005).

On the input text "The giraffe has really long neck", the semantic role labeler yields:

verb have.03: sense 03, to own, to possess
arg0: owner="The giraffe"
arg1: possession="a long neck"

Each of the arguments ("The giraffe"; "a long neck") associated to the verb "have" form potential target phrases. In the following, the example is continued using the argument "The giraffe" as the target phrase, and generate a complete target based on said target phrase.

Following the SRL, the target identification process (S230) generates a coarse target by selecting the appropriate question type for the target phrase. The coarse target is created using a question type database (235) which maps a pair or tuple comprising a verb sense and a corresponding argument to a question type. The creation of the question type database is described in closer detail later on in connection with FIG. 5. Based on the question type database, the coarse targets are created by looking up the question type in the database for each target phrase. For example, the target phrase "the giraffe" may be associated with the coarse question type "who/what" for forming the target ("who/what"; "The giraffe").

In case that the coarse question type derived from the question type database is "who/what", a refinement step (S240) may be performed. By means of said refinement step, the coarse question type "Who/what" is refined. More specifically, by means of said refinement step a decision is made whether the "who/what"—question is a "who"—or a "what"—question. Said refinement step is explained in closer detail later on in connection with FIG. 3.

After performing the refinement step (S240), a question specialization step may be performed (S250). Said question specialization step is configured to decide whether and how to specialize a generic question into a more specific question. For example, based on the input text "The giraffe has really long neck"

a generic question may be for example:

"What has a really long neck?"

So according to the upper-mentioned generic question, the specialization step may replace the generic term "What" with the specific term "What animal".

The final result of the target generation process 200 is a set of targets, each target comprising question type/target phrase tuple, wherein one target is generated for each argument of each verb detected by the semantic role labeler (SRL) in step S220.

Figure 3:
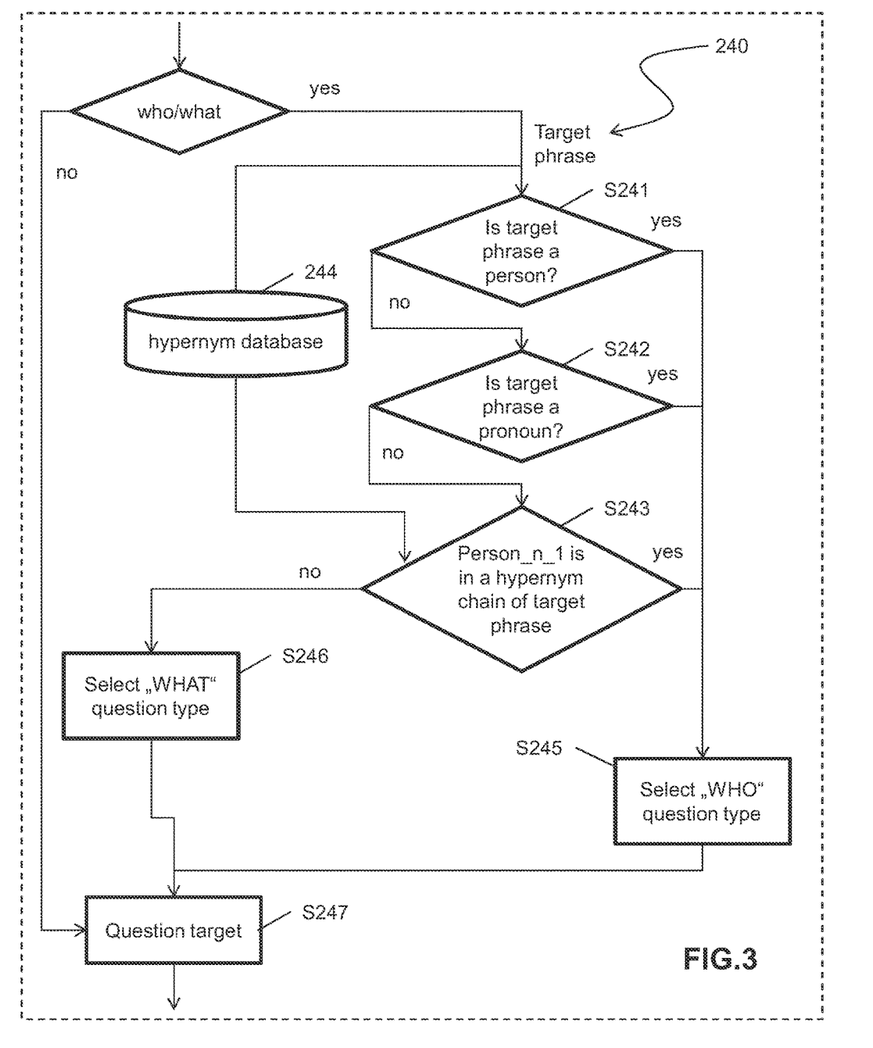
FIG. 3 schematically illustrates an example data flow structure of a Who/What refinement step.

With reference to FIG. 3, the "who/what"—refinement S240 is described in closer detail. As already mentioned before, said "who/what"—refinement is adapted to refine the coarse "who/what"—question type into either "who" or "what". For making said decision, investigations are made whether the target phrase is a PERSON (S241) (said target phrase type is detected by the named entity recognizer (NER) during parsing the input text using said MRS generating grammar (S110)), a pronoun (S242) (as determined during parsing the input text using said MRS generating grammar (S110)) or if the target phrase includes the hypernym person$_{13}$ n_1 in its hypernym chain (S243). The hypernym chain is provided by a lexical database (e.g. WordNet) providing a chain of hypernyms for a received target phrase (hypernym database 244). Said hypernym chain may comprise a plurality of hypernyms which are arranged according to their level of concretization in a concretization level decreasing manner, i.e. the hypernym chain starts with the most specific hypernym and ends with the most general one.

For example, the hypernym chain for the target phrase "giraffe" is

```
=>giraffe
    => ruminant
        => artiodactyl mammal
            => hoofed mammal
                => placental mammal
                    => mammal
                        => vertebrate
                            => chordate
                                => animal
                                    => organism
                                        => living thing
                                            => whole, unit
                                                => physical object
                                                    => physical entity
                                                        => entity.
```

If the target phrase is either a person or a pronoun or the hypernym chain comprises the word person_n_11, the question type "who" is selected (S245). In every other case, the question type "what" is selected (S246). Finally, the refined target is output, for example the target ("what", "The giraffe") (S247).

Figure 4:
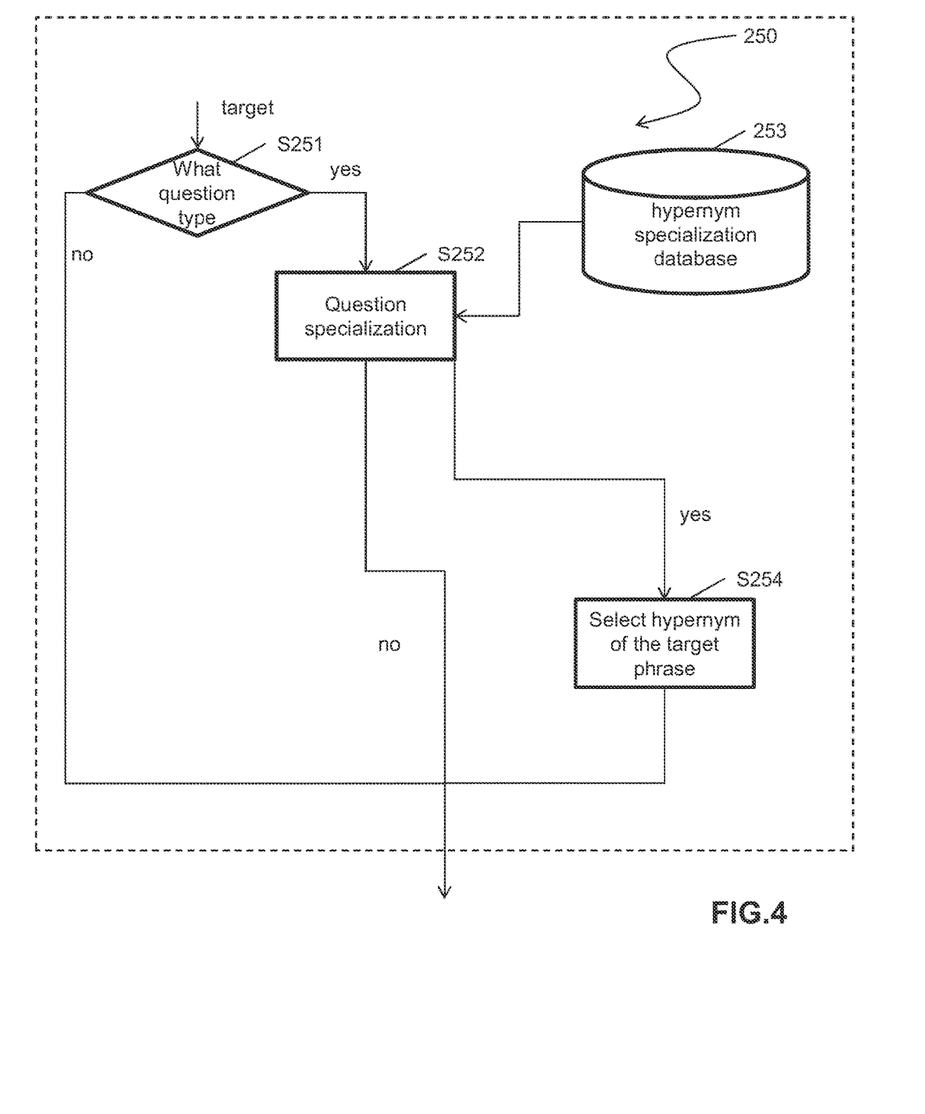
FIG. 4 schematically illustrates an example data flow structure of a question specialization step.

FIG. 4. illustrates the question specialization step (S250, FIG. 2). Said question specialization is used for "What" questions in order to generate natural questions by specifying the target phrase based on a hypernym database (e.g. WordNet).

In case that the "who/what"—refinement step (S251) determined a "What"—question (e.g. the received target comprises question type "what"), a question specification step is executed (S252). Said specialization step makes use of a hypernym specialization database 253 providing at least one hypernym specialization tuple for the respective target phrase. For example, a hypernym specialization tuple including the target phrase "giraffe" may be {"giraffe", "animal"}. If the target phrase may comprise multiple meanings, the question specialization step may disambiguate the sense of the target phrase based on the context of the input text (i.e. multiple sentences close to the input sentence which comprises the target phrase based on which the question should be formulated). For example, the target phrase "check" could mean either a bank check or a checkmark on paper, and the specific questions about said two different kinds of "check" will be different. For disambiguating the target phrase, an external word sense disambiguation tool (such as WordNet::SenseRelate) may be used. After disambiguating the target phrase, the hypernym specialization database 253 may provide multiple hypernym specialization tuples in order to specify the question. In step S254, a certain hypernym of the hypernym specialization tuple may be selected, namely the hypernym which leads to the most natural sounding question. For example, the target ("What", "The giraffe") may lead to the non-specific question/answer pair "What has a long neck?"/"The giraffe".

After specializing the question, the question/answer pair may be

"What animal has a long neck?"/"The giraffe", which sounds more natural.

Figure 5:
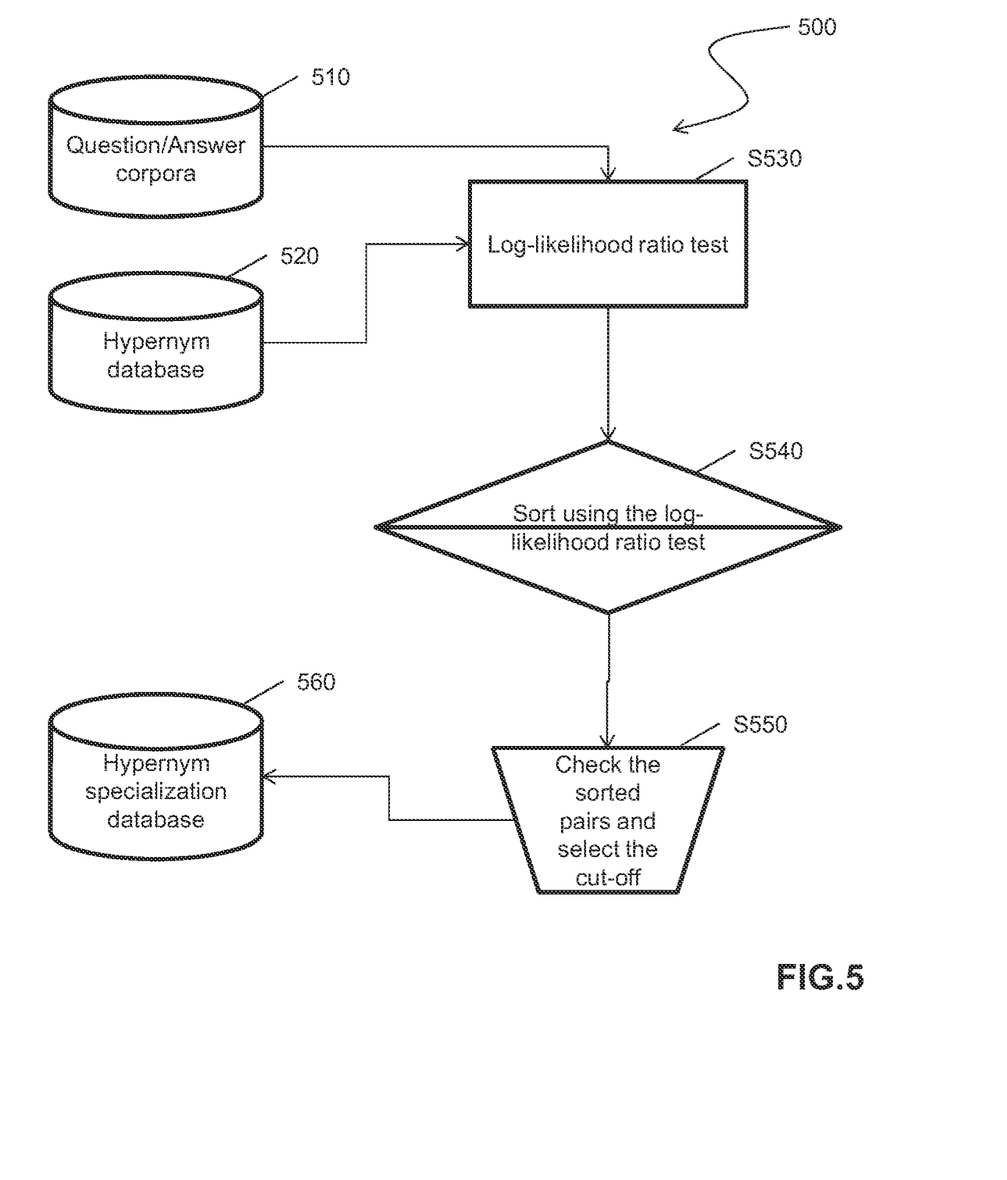
FIG. 5 schematically illustrates an example data flow structure for generating a hypernym specialization database.

The generation of the hypernym specialization database 253 may be described in the following based on FIG. 5. The subsystem 500 for creating the data of the hypernym specialization database provides hypernym specialization tuples which are stored within the hypernym specialization database 560. In other words, a category b is associated with a target phrase a such that the category b is suitable for "what <category>" type questions. For each target phrase a a category b is selected such that:

1. b is a hypernym of a.
2. Question "What b . . . ?" must sound "natural".

To find all the hypernyms of a, a lexical database hypernym database 520 (e.g. WordNet) may be used (c.f. the hypernym chain of the word "Giraffe"). In order to avoid too vague or abstract categories, the hypernyms within four levels of the root are excluded. Returning to the "giraffe"—example, the hypernyms "entity", "physical entity", "physical object" and "whole unit" are excluded.

Of the remaining hypernyms, some sound more natural in a question than others. For example, "What animal has a long neck?" is a more common and natural question than "What hoofed mammal has a long neck?" To select the most "natural" hypernym, we train a statistical model from human-created questions and answers corpus, wherein the question/answer corpora are provided by a question/answer corpora database 510.

Let A and B be the binary random variables where A is true if the word a appears anywhere in the answer (of a respective question/answer corpus) and B is true if the corresponding question (of the question/answer corpus) has the form "Which/what b . . . ". The binomial distributions p(B,A), p(A) and p(B) are estimated from the training corpus for every combination of a and b. If a and b appeared in the same question/answer corpus coincidentally (A and B were independent), then the probabilities p(B|A)=p(B|$\bar{A}$)=p(B) (e.g. p(B|$\bar{A}$) is the probability of seeing "Which/what b" in the question, given that a does not appear in the answer). However if b was a particularly good category for the word a, then p(B|A) would be substantially greater than p(B|$\bar{A}$).

The likelihood ratio test statistic $\Lambda(x,a,b)$ may be used as a measure of the difference between the binomial distributions p(B|A) and p(B|$\bar{A}$) on the question/answer corpus x, for the word a and category b. The null hypothesis would be p(B|A)=p(B|$\bar{A}$)=p(B).

$$D(x,a,b) = -2 \ln(\Delta(x,a,b)) = 2(\ln L(p_1,k_1,n_1) + \ln L(p_2,k_2,n_2) - \ln L(p_{null},k_1,n_1) - \ln L(p_{null},k_2,n_2)$$

The equivalent log-likelihood ratio test statistic $D(x,a,b) = -2 \ln(\Delta(x,a,b))$ for binomial distributions is straight-forward to compute and the computation is summarized below.

The L(p,k,n) is the binomial distribution likelihood of seeing k events out of n trials, with the event probability p, so $$\ln L(p, n, k) = k \ln p + (n-k)\ln(1-p) + \ln\binom{n}{k}$$

$p_1$, $p_2$ and $p_{null}$ are the event probabilities for p(B|A), p(B|$\bar{A}$), and p(B) respectively. They are chosen to maximize the likelihood on the corpus, and k and n are estimated from the data:

$$p_1 = \frac{k_1}{n_1}, \; p_2 = \frac{k_2}{n_2} \text{ and } p_{null} = \frac{k_1+k_2}{n_1+n_2}$$

-continued $$k_1 = K(ba), \; n_1 = K(ba) + K(\bar{b}a)$$
$$k_2 = K(b\bar{a}), \; n_2 = K(b\bar{a}) + K(\bar{b}\bar{a})$$

K( ) is the count of question/answer pairs in the corpus satisfying some property, E.g. K($\bar{b}a$) is the count of question/answer pairs with the word a in the answer and not having the "which/what b" in the question.

To find best category b* from all of the allowed hypernyms for the word a, we select the one with the highest log-likelihood ratio:

$$b_a^* = \underset{b \in hypernyms(a)}{\mathrm{argmax}} \; D(x, a, b)$$

This test is well-suited even for situations where np(1-p)<5, for some a, b. In these situations, the assumption that the binomial distribution is approximated by the normal distribution breaks down, and tests based on this assumption (such as the chi-squared test) do not work.

So in step S530, the above-mentioned log-likelihood ratio may be determined based on the question/answer corpora database 510 reflecting human created question/answer pairs and the lexical database or hypernym database 520 (e.g. WordNet). Afterwards the obtained results (word/hypernym tuple) may be sorted. (S540) according to their log-likelihood ratio. Preferably, the sorted results may be checked (which may be a manual process of a person) and a certain cut-off may be selected (S550) such that if no result is above the cut off, the word/category tuple will not be entered in the database 560 and the question specialization will not be performed. Otherwise, the obtained word/category tuple may be stored in the hypernym specialization database 560.

Figure 6:
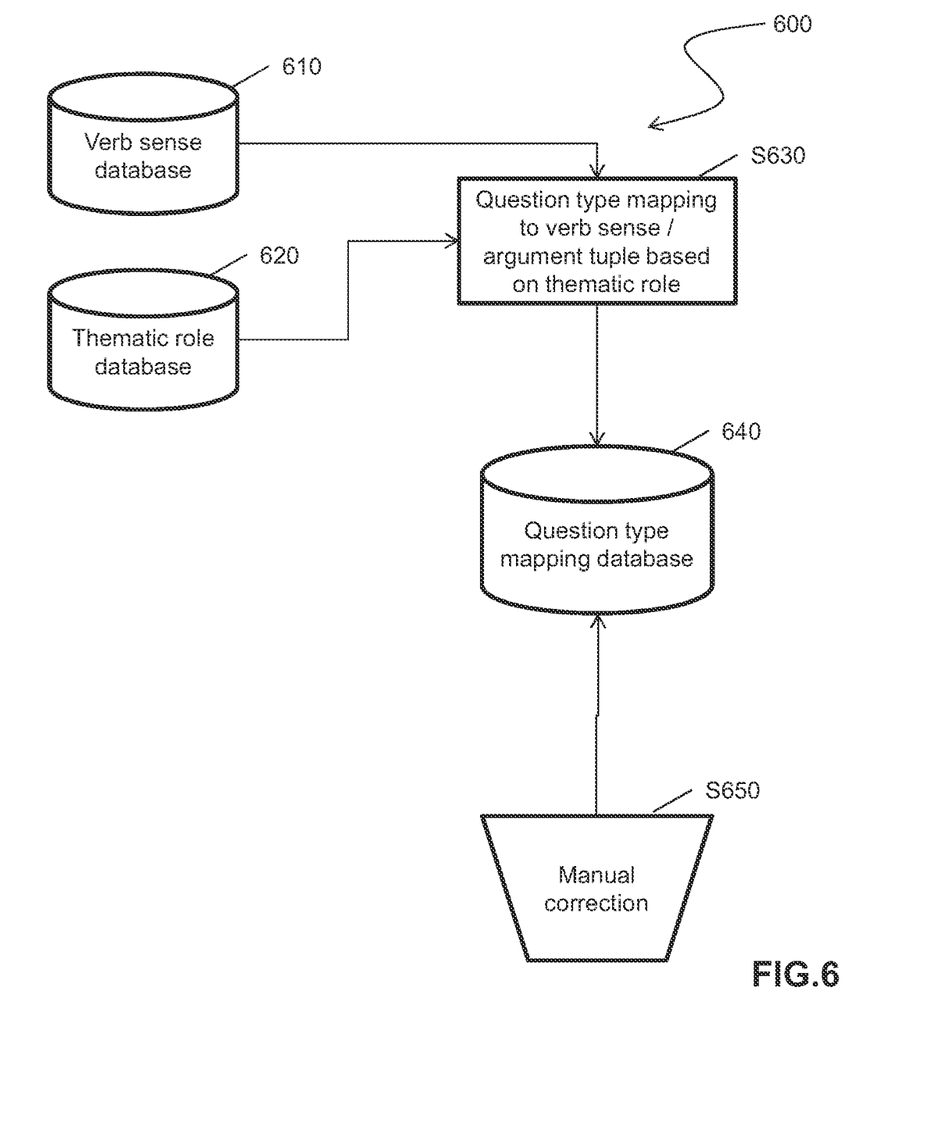
FIG. 6 schematically illustrates an example data flow structure for generating a question type database.

FIG. 6 illustrates the process 600 of establishing the question type database (240, see FIG. 2) in closer detail. The question type database is independent of any particular sentence for which we are generating questions, and may be prepared off-line. For establishing the question type database, a verb sense database 610 and a thematic role database 620 may be used and the information contained in said databases may be combined in order to derive an appropriate question type for a specific target phrase. The verb sense database 610 may be, for example, the PropBank database and the thematic role database 620 may be, for example, the VerbNet database.

To continue with the upper-mentioned example ("The giraffe has really long neck"), the verb sense database 610 assigns the senses "to own", "to possess" to the verb "have" and the thematic role database 620 assigns the following thematic roles to the arguments "The giraffe"; "a long neck":
verb have.03: sense 03, to own, to possess
  arg0: owner="The giraffe" (VerbNet role: pivot)
  arg1: possession="a long neck" (VerbNet role: theme)

There are about twenty roles defined in VerbNet (e.g Pivot, Theme, Destination, Agent, Time, Instrument, Location, etc.). To each VerbNet role, a question type is manually assigned. Using the thematic roles as the intermediary, an initial question type is mapped to every (verb sense, argument) tuple (S630) and stored in the question type database (640). The question types can be corrected in the cases where the initial assignment was incorrect (S650). In addition, specific question types may be created for particular verbs. In the present example, the "who/what" question type is correctly assigned to both the "pivot" and the "theme" roles and no manual adjustment is required:

verb have.03: sense 03, to own, to possess arg0: owner="The giraffe" (VerbNet role: pivot)→"who/what"

arg1: possession="a long neck" (VerbNet role: theme)→"who/what"

Figure 7:
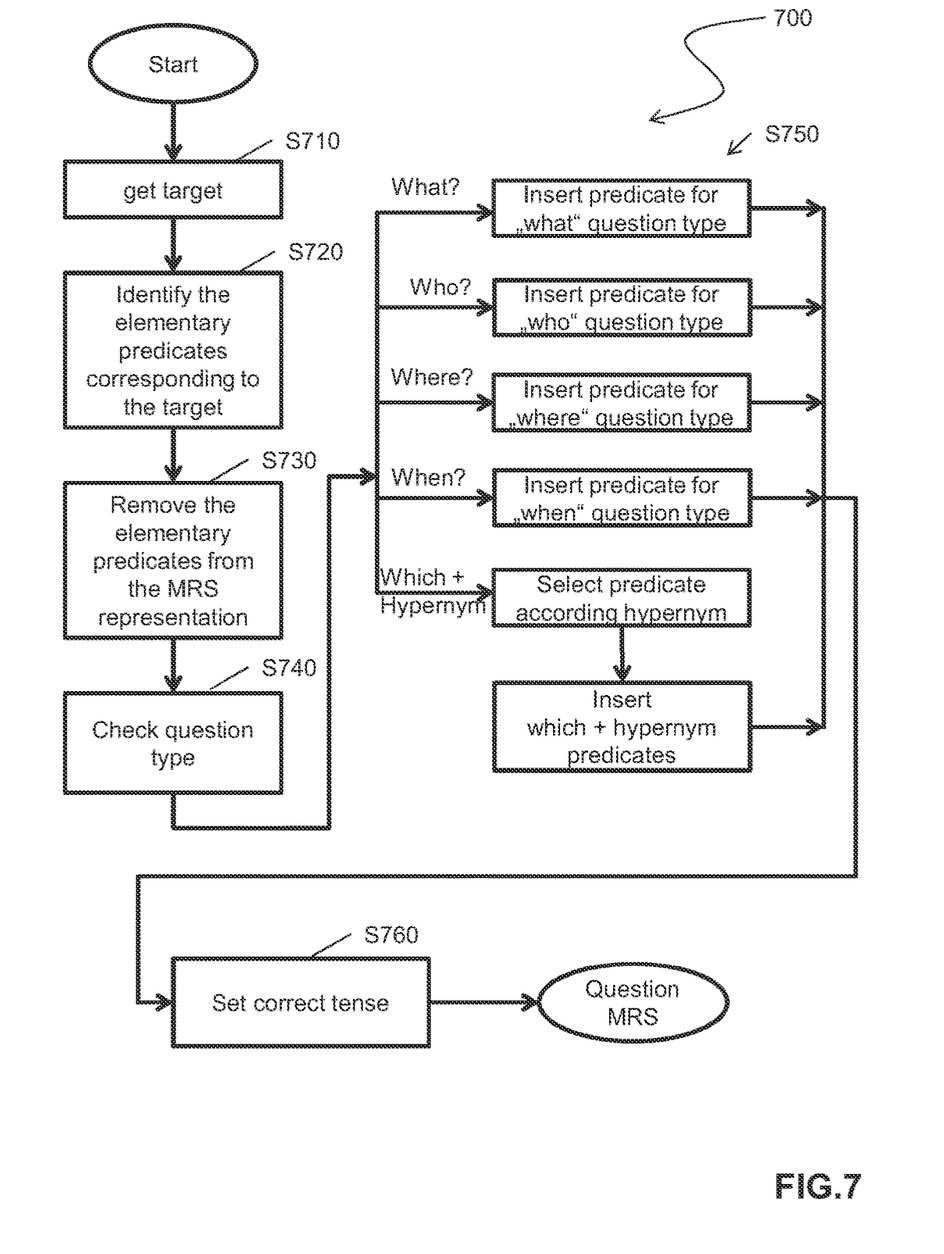
FIG. 7 schematically illustrates an example data flow structure for transforming a MRS representation of the input text into a question. MRS representation.

FIG. 7 illustrates the transformation process 700 of a minimal recursion semantics (MRS) representation of the input text specifically of an input sentence) in a MRS representation of a corresponding question. After receiving the target (S710) (based on which the question should be formulated, e.g. {"What", "The giraffe"}), the elementary predicates corresponding to said target are identified (S720). Subsequently, the elementary predicates corresponding to said target (included in the MRS representation of the input text) are removed (S730). The question predicates are mainly influenced by the question type. So, the question type (included in the target) is checked (S740). Based on the question type, the appropriate question type predicates are inserted (S750). The inserted predicates may be hard-coded for the respective question type. Finally, the correct tense for the verb is determined (S760) and the MRS representation of the question is provided as an output. Based on the MRS representation of the question, one or more questions can be generated by using said MRS generating grammar (e.g. ERG) which was also used during parsing the input text (cf. step S160 of FIG. 1). In case of generating multiple questions based on said question MRS representation, the most natural question may be selected (cf. step S170 of FIG. 1).

Figure 8:
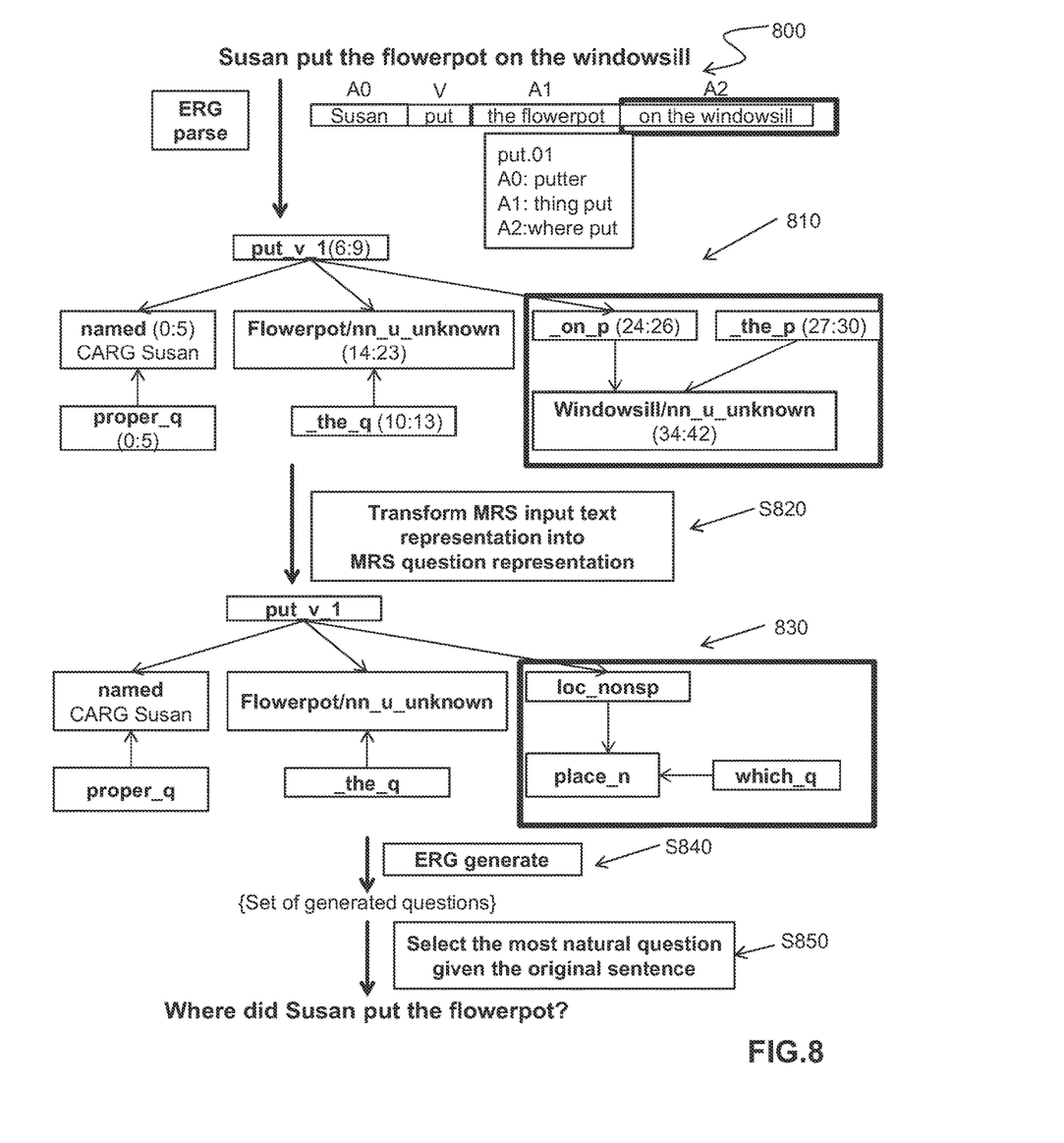
FIG. 8 schematically illustrates the automatic generation of a question using MRS transformation.

FIG. 8 illustrates the question generation process 800 based on a dependency—MRS (DMRS) tree representation. By parsing the input text (in the current example the input sentence "Where did Susan put the flowerpot?") (Step S110 of FIG. 1), an input text structure may be established. The verb "put" and the associated arguments "Susan" (putter), "the flower pot" (thing put), "on the windowsill" (where put) are labeled by the SRL. The structure can be visualized by means of a DMRS tree (810).

Each elementary predicate includes a source character range denoting the part of the source text from which it was parsed. For example, the elementary predicate _put v_1 comes from characters (6:9) in the original input text. According to the present example, the target phrase may be "on the window sill" (as indicated by the borders). In this example, the target identification step (S230) creates the target "on the windowsill"/"where", for the target phrase "on the windowsill".

As already explained before, during MRS transformation (S820) the elementary predicates of the target phrase of the input text are replaced by question predicates. Therefore, all the elementary predicates whose character ranges intersect the target phrase marked by the SRL, parser are removed. In addition, also any preposition nodes which depend on the just-removed nodes are removed because the SRI sometimes does not include the preposition in the target phrase.

The nodes corresponding to the removed elementary predicates for the target phrase "on the windowsill" are enclosed in the border 810 in FIG. 8.

As already mentioned in connection with FIG. 7, the inserted replacement. elementary predicates are hard-coded for every question type. The system may generate when/where/what/who/how much/how many/etc.

In the example of FIG. 8, the elementary predicates corresponding to the "where" question are inserted, resulting in the new DMRS tree 830 denoting the question "Where did Susan put the flowerpot?". The nodes enclosed in the border correspond to inserted elementary predicates for "WHICH PLACE" which will generate the "Where" question in natural text.

Given the MRS representation of the question, a text generator (e.g. Linguistic Knowledge Builder (LKB) tool) may use a MRS generating grammar (e.g. ERG) to generate one or more output questions from the MRS representation of a question (S840). In case of generating multiple questions from a single question MRS representation, the most natural one may be selected (S850) based on an algorithm evaluating the similarity between a machine-generated question and a natural human question, for example, the Bilingual Evaluation Understudy (BLEU) algorithm (cf. step S170 of FIG. 1).

The foregoing description of embodiments has been presented for purposes of illustration and description. It is not intended to be exhaustive or to limit embodiments of the present invention to the precise form disclosed. Modifications and variations are possible light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations without leaving the scope of the underlying principle ideas.

The invention claimed is:

1. A computer-implemented method for generating a natural language question for an input text, the method comprising:

parsing the input text using a minimal recursion semantics (MRS) generating grammar to obtain a minimal recursion semantics (MRS) representation of the input text;

transforming, by semantic role labeling (SRL), the input text into at least one semantic association of a verb and semantic arguments of the verb, the semantic arguments of the verb being fragments of the input text;

receiving a question type for at least one verb/semantic argument association;

transforming the MRS representation of the input text into a MRS representation of one or more questions based on the at least one semantic association of the verb and respective question types, wherein transforming the MRS representation of the input text into the MRS representation of the one or more questions comprises:

identifying a target phrase within the input text;

removing predicates of the target phrase thereby obtaining a modified target phrase; and inserting predicates of a corresponding question in the modified target phrase in order to obtain a question target phrase; and generating at least one question of the one or more questions based on the MRS representation of the at least one question using the MRS generating grammar.

2. The method according to claim 1, further comprising:

performing a target generation, the target generation providing targets comprising the question type and the target phrase based on the input text.

3. The method according to claim 2, wherein the target phrase is determined based on the SRL providing a semantic association of a verb to a semantic argument of the verb.

4. The method according to claim 1, wherein the inserted predicates of a corresponding question depend on the question type.

5. The method according to claim 1, wherein the question type is determined based on a question type database.

6. The method according to claim 5, wherein the question type database assigns the question type to a tuple comprising a verb and the target phrase using thematic roles, wherein a specific thematic role is assigned to a respective target phrase of the tuple using a thematic role database.

7. The method according to anyone of the claim 5, wherein the question type is determined based on the question type database is a coarse question type which is refined or adjusted.

8. The method according to claim 7, wherein the coarse question type is refined or adjusted based on information of the target phrase responsive to the target phrase being detected as a person, a pronoun, or being a target phrase having the hypernym "human".

9. The method according to claim 1, wherein, responsive to the question type being "what", question specialization is performed based on a hypernym of the target phrase.

10. The method according to claim 9, wherein the hypernym is provided indirectly by a hypernym database providing a plurality of hypernyms for the target phrase, wherein usage of a set of abstract hypernyms is rejected.

11. The method according to claim 9, wherein the hypernym is selected out of a set of multiple hypernyms of the target phrase based on a statistical model defining a natural hypernym for the target phrase.

12. The method according to claim 11, wherein a set of questions is generated based on the MRS representation of the at least one question using resource grammar and wherein a question from the set of questions is selected using an algorithm, and wherein the algorithm is a Bilingual Evaluation Understudy (BLEU) algorithm for evaluating a naturalness of the question from the set of questions based on the input text.

13. A data processing system for generating a natural language question for an input text, the data processing system comprising:
a processor; and
a memory coupled to the processor, wherein the memory comprises instructions which, when executed by the processor, cause the processor to:
parse the input text using a minimal recursion semantics (MRS) generating grammar to obtain a minimal recursion semantics (MRS) representation of the input text;
transform, by semantic role labelling, the input text into at least one semantic association of a verb and semantic arguments of the verb, the semantic arguments of the verb being fragments of the input text;
receive a question type for at least one verb/semantic argument association;
transform the MRS representation of the input text into a MRS representation of one or more questions based on the at least one semantic association of the verb and respective question types, wherein the instructions to transform the MRS representation of the input text into the MRS representation of the one or more questions further cause the processor to:
identify a target phrase within the input text;
remove predicates of the target phrase thereby obtaining a modified target phrase; and
insert predicates of a corresponding question in the modified target phrase in order to obtain a question target phrase; and
generate at least one question of the one or more questions based on the MRS representation of the at least one question using the MRS generating grammar.

14. A computer program product comprising a non-transitory computer readable storage medium having a computer readable program stored therein, wherein the computer readable program, when executed by a data processing system, causes the data processing system to:
parse the input text using a minimal recursion semantics (MRS) generating grammar to obtain a minimal recursion semantics (MRS) representation of the input text;
transform, by semantic role labelling, the input text into at least one semantic association of a verb and semantic arguments of the verb, the semantic arguments of the verb being fragments of the input text;
receive a question type for at least one verb/semantic argument association;
transform the MRS representation of the input text into a MRS representation of one or more questions based on the at least one semantic association of the verb and respective question types, wherein the computer readable program to transform the MRS representation of the input text into the MRS representation of the one or more questions further causes the data processing system to:
identify a target phrase within the input text;
remove predicates of the target phrase thereby obtaining a modified target phrase; and
insert predicates of a corresponding question in the modified target phrase in order to obtain a question target phrase; and
generate at least one question of the one or more questions based on the MRS representation of the at least one question using the MRS generating grammar.

15. The computer program product according to claim 14, wherein the computer readable program further causes the data processing system to:
perform a target generation, the target generation providing targets comprising the question type and the target phrase based on the input text.

16. The computer program product according to claim 15, wherein the target phrase is determined based on the SRL providing a semantic association of a verb to a semantic argument of the verb.

17. The computer program product according to claim 14, wherein the inserted predicates of a corresponding question depend on the question type.

18. The computer program product according to claim 14, wherein the question type is determined based on a question type database.

* * * * *